Aug. 22, 1944. E. J. SHIMEK Re. 22,535

MASTER CONTROL FOR ELECTRIC SEISMOGRAPHS

Original Filed Feb. 21, 1940 2 Sheets-Sheet 1

INVENTOR
E. J. SHIMEK
BY Dallas R. Lamont
ATTORNEY

Aug. 22, 1944. E. J. SHIMEK Re. 22,535

MASTER CONTROL FOR ELECTRIC SEISMOGRAPHS

Original Filed Feb. 21, 1940 2 Sheets-Sheet 2

INVENTOR.
E. J. Shimek
BY Dallas R. Lamont
Attorney.

Reissued Aug. 22, 1944

Re. 22,535

UNITED STATES PATENT OFFICE 22,535

MASTER CONTROL FOR ELECTRIC SEISMOGRAPHS

Edwin J. Shimek, Dallas, Tex., assignor, by mesne assignments, to Socony-Vacuum Oil Company, Incorporated, New York, N. Y., a corporation of New York Original No. 2,317,334, dated April 20, 1943, Serial No. 320,132, February 21, 1940. Application for reissue April 14, 1944, Serial No. 530,992

10 Claims. (Cl. 177—352)

This invention relates to electric seismographs and more particularly to a method and apparatus for controlling the gain in amplification as derived from a thermionic tube amplifier throughout the period of time during which seismic waves which have been created in the earth's surface are being detected and amplified.

Another feature of this invention resides in the provision of means whereby a geophone that is used to detect waves which travel vertically to the surface from the explosive charge, can be automatically cut out of the circuit so that the trace on which the vertically traveling waves has been recorded, can be used to record signals which have been generated by one of the geophones forming the spread.

Heretofore, it has been necessary to use a separate trace on the seismogram for recording the "uphole" or vertically traveling waves. This difficulty has been overcome by the provision of a circuit that is energized by the time break for operating a delayed acting relay to disconnect this geophone, which has been connected in parallel with one of the geophones forming the spread.

A number of methods for controlling the gain in amplification as derived from a thermionic tube amplifier while amplifying seismic waves are known in the art. These methods, however, have not proven entirely satisfactory, since they did not control the amplification characteristics of the amplifier in such a manner that all the necessary data from a single spread, when shot in one direction, could be recorded on a single seismogram. The master control forming the subject matter of this application makes such a record possible. The gain in amplification as derived from the amplifier is allowed to remain at a maximum value until signals corresponding to the first direct traveling wave energy have been recorded. Then the gain is automatically reduced to a predetermined value so that shallow reflections carrying high energy can be recorded on a limited width of recorder strip. The gain in amplification then is caused to increase with time as deeper and deeper reflections are detected and amplified.

Therefore, the primary object of this invention resides in the provision of a master control for electric seismograph amplifiers, in conjunction with auxiliary circuits, by means of which it is possible to record all the data required from a single spread when shot in one direction on a single seismogram.

Another object of this invention resides in the provision of means whereby an uphole geophone can be cut out of the circuit after the vertically traveling waves have been detected at the surface.

Still another object of the invention is the provision of means for controlling the gain in amplification as derived from an electric seismograph amplifier in such a manner that it will remain at a maximum until signals corresponding to the first direct traveling seismic waves have been recorded, after which it is immediately reduced to a predetermined low value and then automatically expanded with time in substantially inverse proportion to the envelope of the detected signals.

Another object of this invention is the provision of means, initiated by the detonation of the explosive charge, for placing the master control in operation.

This invention also contemplates a master control for controlling the gain in amplification as derived from a plurality of amplifiers.

Other objects and advantages of the invention will be apparent from the following detailed description when considered in the light of the drawings in which.

Figure 1:
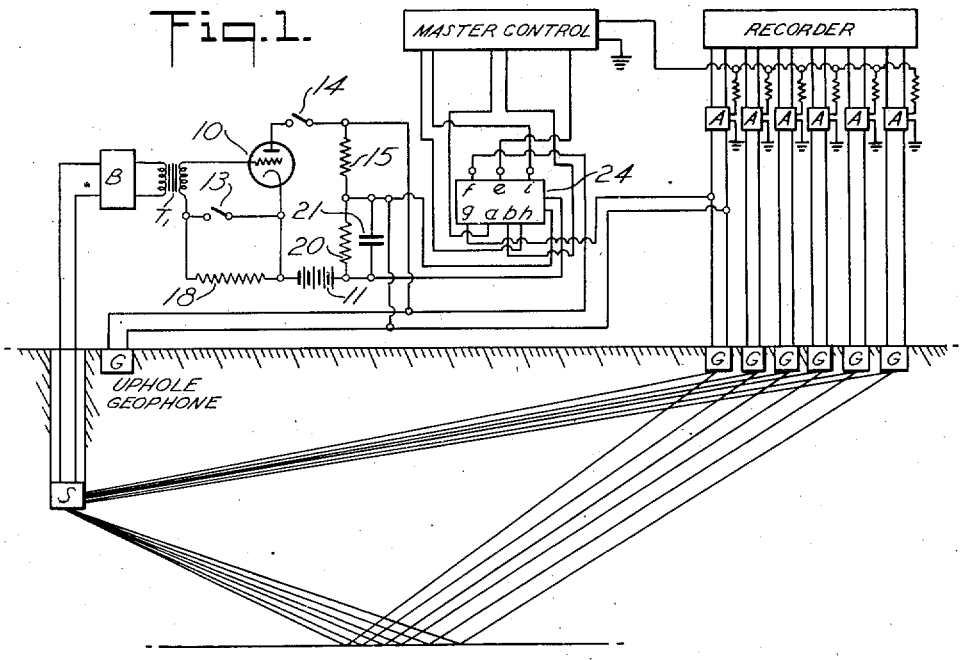
Figure 1 is a diagrammatic illustration of a complete reflection seismograph system showing the location of the geophones relative to the explosive charge.

Referring to the drawings in detail, particularly Figure 1, there is illustrated the usual seismic survey operation using the reflection method by means of which data can be recorded from which to compute and plot profiles of the subsurface geological strata. These data are in the form of wave travel velocities, the waves being created in the earth's surface by the detonation of an explosive charge S and detected by one or more geophones G, amplified by the amplifier A and recorded on a recording galvanometer R. Waves emanating from S are in the form of a complex wave train. Some of the waves travel directly to the geophone through the surface of the earth, while others are transmitted downwardly to the interfaces of substrata from which they are reflected and detected by the geophone. Still other waves travel vertically upward to the surface where they are recorded by a geophone placed near the shot hole for the purpose of measuring the velocity of wave travel in the unconsolidated weathered surface layer of the earth. Various detailed methods of accomplishing this result are well-known to those skilled in the art and need not be discussed here.

The sequence of events occurring at the geophone after the detonation of an explosive charge is first the detection of the first direct traveling waves, followed by the detection of waves which have been reflected from the interfaces of substrata that it is desired to profile.

The geophone G can be of any type adapted to convert seismic waves impinging on it into electrical signals. These electrical signals that are generated by the geophone are amplified through as many stages of amplification as required and recorded by means of a recording galvanometer on a sensitized paper or photographic film in the form of traces, there being a trace for each geophone station in the spread.

Seismic surveying by the reflection method depends upon an analysis of the records of the waves recorded and the determination of the instant of arrival of these waves at the geophone or geophones. Additionally, in order to make corrections for "weathering" to the times of arrival of the reflected waves, it is necessary to determine the instant of arrival of the first direct traveling waves to reach the geophone or geophones. This means that the record must have an indication of the instant of detonation, some means for indicating on the record the passage of time, a clear record of the instant of arrival of the first direct traveling waves and the instant of arrival of the succeeding reflected waves. The direct traveling waves and those waves which have been reflected from relatively shallow interfaces carry a high amount of energy and if the sensitivity of the apparatus was allowed to remain constant while recording these and the subsequent reflected waves, a record would be obtained which would be of little value, since the high energy could not be recorded in a legible manner on a recorder strip of limited width. Therefore, means must be provided for maintaining the sensitivity of the instrument at a high value until the first direct traveling waves have been recorded, then decreasing the sensitivity of the apparatus to a point that waves reflected from shallow interfaces which carry high energy, will not go off of the recorder strip, then automatically increasing the sensitivity of the apparatus as the energy of the reflected waves from the deeper interfaces decreases, so that all of the signals representing reflected wave energy will be recorded at substantially the same amplitude, regardless of the depth of the interface from which they have been reflected.

As an aid to the determination of the velocity of wave travel in the weathered layer, a geophone is placed adjacent the mouth of the shot hole for detecting waves traveling vertically upward from the explosive charge. The record from a geophone so placed heretofore has been recorded on a separate trace. In a recording galvanometer having a predetermined number of vibrating elements, this procedure would obviously limit by one the number of geophone stations that could be used in the spread. This difficulty can be overcome by connecting the uphole geophone in parallel with one of the geophones in the spread through the medium of means whereby it can be disconnected from the recorder after it has served its purpose. The other geophone then will function in the normal manner. The result would be that one of the traces would have not only the usual recorded data that would be similar to that of the other traces but would have in addition thereto a record of the arrival of the uphole waves at the geophone that was located near the mouth of the shot hole.

Figure 2:
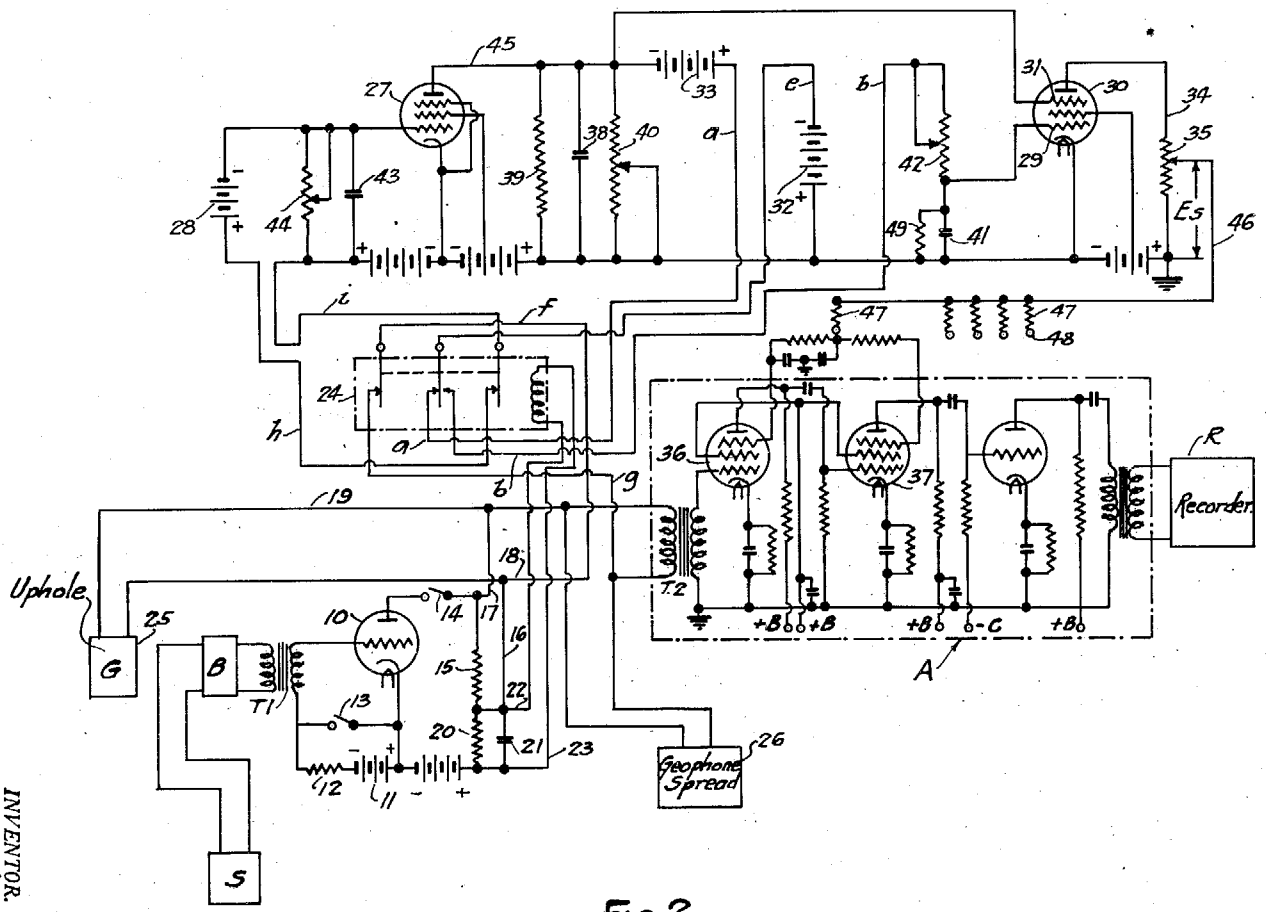
Figure 2 is a composite circuit diagram showing the invention forming the subject matter of this application incorporated in the circuits of an electric seismograph.

Referring to Figure 2, the explosive charge S is detonated in the conventional manner by a blaster B. Rupturing the blaster circuit by the detonation of the explosive charge generates a transient voltage in the circuit that will pass through the transformer $T_1$ to the grid circuit of a gas triode tube 10. The grid of the gas triode tube 10 is negatively biased by the battery 11 to prevent it from firing in the manner well-known in the art. The resistance 12 is placed in series with the battery 11 to prevent short-circuiting the battery when the switch 13 is closed for test purposes. The transient voltage from the transformer $T_1$ causes the negative potential on the grid of the gas triode to become less negative to a point where the grid no longer has control and plate current will immediately begin to flow in the plate circuit, the switch 14, provided for test purposes, is normally closed. The plate current from the gas triode flowing through the resistance 15 produces an IR drop across it. This voltage, by means of the conductors 16 and 17, 18 and 19, is conducted to the input transformer $T_2$ of the amplifier A through which it passes to reach the recording galvanometer R, where it is recorded as an indication of the instant of detonation of the explosive charge S. The plate current from the gas triode also passes through the resistance 20 producing an IR drop across this resistance that serves as the charging potential for the condenser 21. The voltage from this condenser, by means of conductors 22 and 23, operates a multiple contact relay 24. The capacity of condenser 21 and the value of resistance 20 is so selected that ample time will elapse between the instant of detonation of the explosive charge, which coincides with the time that the condenser begins to receive its charge, and the time at which the relay 24 operates to disconnect the geophone 25 from the input transformer of the amplifier. The operation of the relay 24 accomplishes this by opening contacts *f—g*. It will be noticed that before contacts *f—g* have been opened, both the time break and the detected uphole waves have been recorded. The signals from the geophone 26 can be recorded on the same trace, after amplification, in the usual manner. The amplifier A, but for the automatic gain control, is conventional. The use of pentode tubes in the first two stages of the amplifier provides suppressor grids by means of which the gain in amplification as derived from these two stages can be controlled by varying their bias potential.

Additionally, distortion produced by applying a varying potential to an odd number of stages will be avoided by applying such varying potential to an even number of stages in the amplifier.

The varying suppressor bias potential is supplied by a novel circuit arrangement, to be described hereafter, whose operation is initiated by the relay 24. Before the detonation of the explosive charge S, the relay contacts *a—e*, *h—i* and *f—g* are closed, and contacts *b—e* are open. With this condition existing, the tube 27 is blocked by the potential that is supplied by the battery 28. With contacts *b—e* open, the grid 29 of tube 30 is at cathode potential but grid 31 of tube 30 with contacts *a—e* closed, is biased by means of the batteries 32 anad 33 to a point considerably beyond the cut-off value by proper choice of these voltages. With this condition existing, there will be no plate current flowing in the plate circuit 34 of tube 30 and therefore no drop produced in the resistance 35. As a result, tubes 36 and 37 in the amplifier will operate to produce maximum gain. This condition exists until after detonation of the explosive charge and the condenser 21 becomes charged to the relay actuating potential. When this value has been reached, relay 24 will operate to open contacts *a—e*, *h—i* and *f—g* and close contacts *b—e*. When contacts *a—e* open, the charging potential is removed from condenser 38 and it begins to discharge through the resistances 39 and 40 to cause the negative bias on grid 31 of tube 30 to vary toward zero as the condenser 38 discharges. The rate at which this bias becomes less negative and eventually reaches zero is controlled by the resistors 39 and 40 and is rapid relative to the rate at which the potential of the condenser 41 changes. However, until the instant that the potential on grid 31 reaches the point of cut-off from a point below cut-off, the tube 30 is still blocked and there will be no voltage applied to the suppressor grids of tubes 36 and 37 in the amplifier. The time required for this potential to reach the cut-off potential is so selected by varying the resistance 40 that signals corresponding to the first direct traveling waves that have been detected can be recorded before any suppression of the gain in amplification as derived from the amplifier is effected.

Since at the time contacts *a—e* opened, the contacts *b—e* closed, the potential as supplied by the condenser 41 to the grid 29 of tube 30 begins to become more and more negative at a rate determined by the resistance 42. This change in potential on grid 29 though is slow as compared to the rate of change of potential on grid 31, but this change in the grid voltage on grid 29 will eventually block the tube and bring the potential on the suppressor grids of tubes 36 and 37, which was permitted to increase as the potential on grid 31 became less negative, back to zero at which time the amplifier is again operating at full sensitivity.

Figure 3:
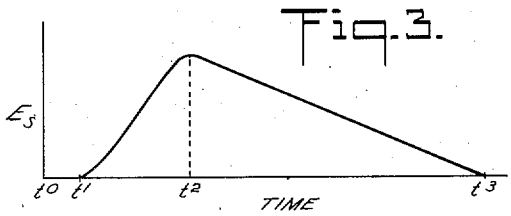
Figure 3 is a curve which has been plotted with negative suppressor grid potential as ordinates and time as abscissae, showing the manner in which the suppressor grid potential as applied to a thermionic tube is caused to vary to effect the desired variation in the gain in amplification as derived from the amplifier.

With the circuit described thus far, the potentials on the suppressor grids of tubes 36 and 37 will be caused to vary in the manner illustrated in Figure 3. This curve has been plotted with negative suppressor grid potential as ordinates and time as abscissae. From the time $t_0$ to $t_1$, the bias of grid 31 of tube 30 is becoming less negative to the point of cut-off. From the time $t_1$ to $t_2$ the potential on grid 31 is becoming less negative and the potential on grid 29 is becoming more negative but at a much slower rate of change than the potential on grid 31. This will result in a suppression in the gain in amplification during the time $t_1$ to $t_2$. From $t_2$ to $t_3$ the biasing potential on grid 29 is controlling and this potential will become more and more negative until tube 30 has again become blocked. During this time $t_2$ to $t_3$ the negative potential supplied to the suppressor grids is becoming less and less negative and will reach zero when tube 30 has been blocked by the potential on the grid 29.

Figure 4:
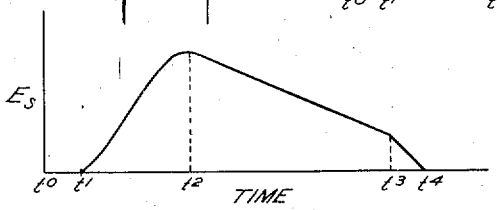
Figure 4 is a second curve that has been plotted with time as abscissae and negative suppressor grid voltage as ordinates showing in addition to the disclosure of Figure 3, an additional step in the voltage control.

Due to the fact that the energy carried by the waves that have been reflected from deep interfaces is relatively low, it is desirable to have the gain in amplification as derived from the amplifier from a certain time on to the end of the record, increase more rapidly. This result is accomplished in the manner hereafter described. During the time when the above described sequence of events were occurring, the voltage across the condenser 43, due to the fact that the contacts *h—i* were opened by the operation of the relay 24, has been increasing positively, but at this instant the tube 27 is still blocked. This positive increase in the voltage across condenser 43 is produced by its discharging through the resistance 44. Therefore, the voltage, due to the absence of plate current in the plate circuit 45 of the tube 27, across the condenser 38, remained at zero potential. However, at a time determined by the choice of resistance 44, the tube 27 becomes conductive and the voltage across the condenser 38 begins to increase negatively. This rate of change will be reflected by means of the grid 31 in the tube 30 to cause the rate of change of suppressor grid bias that is being applied to tubes 36 and 37 in the amplifier to suddenly increase in such a manner that it will approach zero much more rapidly. The curve in Figure 4 represents the manner in which the suppressor grid voltage, as supplied to the tubes 36 and 37 in the amplifier, is caused to behave over the period of time during which seismic waves are being recorded. This curve, like that in Figure 3, has been plotted with negative suppressor grid potential as ordinates and time as abscissae, the periods of time $t_0$ to $t_1$ and $t_1$ to $t_2$ being the same as described in connection with Figure 3. In Figure 3, however, the period of time from $t_2$ to $t_3$ is limited by the time at which the tube 27 becomes conductive. The time $t_3$ to $t_4$ represents variation in suppressor grid potential from the time that tube 27 became conductive to the time that tube 30 was blocked and the suppressor grid potential again became zero.

Figure 5:
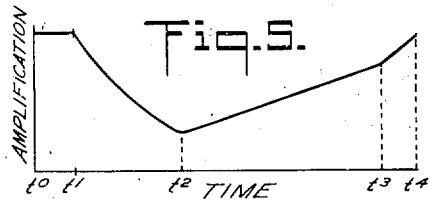
Figure 5 is a curve which has been plotted with gain in amplification as ordinates and time as abscissae showing the manner in which the gain in amplification is caused to vary while recording seismic waves.

A variation of the gain in amplification as derived from tubes 36 and 37 during the same periods of time indicated in Figure 4 would be as shown in Figure 5. During the period $t_0$ to $t_1$, while the suppressor grid potential is zero, the amplifier is operating at maximum sensitivity. As the suppressor grid potential becomes more and more negative during the time $t_1$ to $t_2$, the gain in amplification is suppressed. However, as the suppressor grid potential varies toward a less negative value during the period $t_2$ to $t_3$, the gain in amplification is caused to increase and from the time $t_3$ to $t_4$, during which the negative suppressor grid potential is caused to approach zero more rapidly, the gain in amplification is caused to increase to its maximum more rapidly to return the amplifier to a state of maximum sensitivity.

Although this master control has been illustrated and described in connection with a single amplifier channel, it is to be understood that the voltage drop in resistance 35 by means of the conductor 46 and the decoupling resistors 47 and contacts 48, can be used to simultaneously control the gain in amplification as derived from a plurality of amplifier channels.

The control voltage has been described as applied to the suppressor grids of the pentode type tubes. It is obvious to those skilled in the art that this varying potential may equally as well be applied to the control grids of other types of tubes.

In the above specification the term "uphole waves" has been used to identify those waves which travel vertically upward from the explosive charge to the surface of the earth. The geophone which detects these waves is referred to as the "uphole" geophone.

The detailed circuits of the various elements used in the process and apparatus above have not been specifically described inasmuch as they are commonly known and may be varied within relatively wide ranges without departing from the principles of this invention.

I claim:

1. A method of recording seismic waves that comprises the steps of creating seismic waves in the earth's surface at a point vertically spaced below the surface, generating a signal coincident with the creation of the seismic waves, recording the generated signal on the trace of a seismogram as an indication of the instant of creation of the seismic waves, detecting the first impulses of waves which have traveled vertically upward from their point of creation, amplifying and recording the first impulses on the same trace on which the signal indicative of the creation of the seismic waves has been recorded, rendering inoperative said detecting means after the first impulses of the waves traveling vertically upward have been detected, amplified and recorded, detecting waves which have traversed paths substantially directly from their point of creation to a plurality of detecting stations that are collaterally spaced from said point, amplifying and recording the first impulses of these waves on separate traces one of which being the trace recited above, reducing the gain in amplification imparted to the detected direct traveling waves after their first impulses have been recorded, detecting, amplifying and recording on the separate traces and the first-mentioned trace waves which have traveled downwardly from their point of creation and have been reflected from the interfaces of the substrata, increasing the amplification imparted to the detected reflected waves at a predetermined rate for a predetermined time, independent of signal strength, then accelerating the rate of increase in amplification imparted to the detected reflected waves independent of signal strength during the recording of the remainder of the seismogram, whereby the reflected waves will be recorded with substantially equal amplitude.

2. An apparatus for recording seismic waves comprising in combination, a plurality of means for detecting said waves by generating electrical signals corresponding to them, separate means for respectively amplifying and recording said signals in coordination with time, a single gain control for controlling the gain in amplification imparted to the signals by each amplifier, said gain control comprising means for reducing the gain in amplification after signals corresponding to detected direct traveling waves have been amplified and recorded, means for thereafter increasing the gain in amplification at a predetermined rate through a predetermined period of time, and means for accelerating the rate of increase of the gain in amplification throughout the period of time while the remainder of the record is being recorded, whereby signals corresponding to direct traveling waves are recorded with maximum gain in amplification and signals corresponding to detected reflected waves are recorded with substantially equal amplitude.

3. An apparatus for recording seismic waves comprising in combination, means for detecting said waves by generating electrical signals corresponding to them, means for amplifying and recording said signals in coordination with time, a gain control for controlling the gain in amplification imparted to the signals by said amplifier, means for initiating the operation of the gain control a predetermined period of time after the creation of said seismic waves, said gain control comprising means for reducing the gain in amplification after signals corresponding to detected direct traveling waves have been amplified and recorded, means for thereafter increasing the gain in amplification at a predetermined rate throughout a predetermined period of time, and separate means for accelerating the rate of increase of the gain in amplification throughout the period of time while the remainder of the record is being recorded, whereby signals corresponding to direct traveling waves are recorded with maximum gain in amplification and signals corresponding to detected reflected waves are recorded with substantially equal amplitude.

4. An apparatus for recording seismic waves comprising in combination, means forming a conventional spread for detecting said waves by generating electrical signals corresponding to them, means for amplifying and recording said signals in coordination with time, an additional detecting means adapted to be positioned adjacent the shot point for detecting waves that have traveled vertically upward from their point of creation, means for connecting said additional detecting means to amplifying means common to one of the first mentioned detecting means, a gain control for controlling the gain in amplification imparted to the signals by said amplifier, common means for rendering the additional detecting means inoperative and for initiating the operation of the gain control a predetermined time after the creation of the seismic waves, said gain control comprising means for reducing the gain in amplification after signals corresponding to detected direct traveling waves have been amplified and recorded, means for thereafter increasing the gain in amplification at a predetermined rate through a predetermined period of time, and means for accelerating the rate of increase of the gain in amplification throughout the period of time while the remainder of the record is being recorded, whereby signals corresponding to direct traveling waves are recorded with maximum gain in amplification and signals corresponding to detected reflected waves are recorded with substantially equal amplitude.

5. In a system of recording seismic waves of differing amplitude, the combination of an amplifier for said waves, a gain control for said amplifier comprising means for reducing the gain in amplification at a predetermined rate throughout a predetermined period of time with relation to receipt of said waves, means for thereafter increasing said gain at a predetermined rate throughout a predetermined period of time, and separate means for accelerating the rate of increase of the gain in amplification during a later portion of said second period to raise said gain to a predetermined maximum, whereby the amplitude of the recorded seismic waves is made more uniform than the waves applied to said amplifier.

6. In a system of recording on a recorder strip of limited width seismic waves of differing amplitude, the combination of an amplifier for said waves, a gain control for said amplifier comprising means for reducing the gain in amplification at a predetermined rate throughout a predetermined period of time with relation to receipt of said waves, means for thereafter increasing said gain at a predetermined rate through a predetermined period of time, and separate means for accelerating the rate of increase of the gain in amplification during a later portion of said second period to raise said gain to a predetermined maximum, whereby said seismic waves of differing amplitude may be recorded on said recorder strip of limited width.

7. In a system of recording seismic waves of differing amplitude, the combination of an amplifier for said waves, a gain control for said amplifier comprising means for reducing the gain in amplification for a predetermined period of time with relation to first receipt of said waves by said amplifier, means for increasing said gain at a predetermined rate throughout a succeeding predetermined period of time, and separate means for accelerating the rate of increase of the gain in amplification during a later portion of said second period quickly to raise said gain to a predetermined maximum for maximum amplification of seismic waves of low amplitude.

8. A method of recording seismic waves initially of high amplitude, thereafter of intermediate amplitude and finally of low amplitude, which comprises amplifying and recording the first of said high-amplitude waves, then substantially reducing the amplification and recording the remaining high-amplitude waves, thereafter increasing at a predetermined rate for a predetermined time the amplification and recording said waves of intermediate amplitude, and thereafter rapidly increasing the gain in amplification to a maximum and recording said seismic waves of low amplitude.

9. In a system of recording generated seismic waves of differing amplitude, the combination of an amplifier for said waves, a gain-controlling system for said amplifier including a resistor for producing a gain-controlling biasing potential, an electric valve having a pair of control electrodes and an output circuit including said resistor, means for initially applying a negative bias to a first of said electrodes to render said valve non-conductive, means operable a predetermined time after generation of said waves to initiate decay of said bias to render said tube conductive and to produce a material reduction in said amplification during a time interval, means for concurrently and gradually increasing the negative bias on a second of said electrodes to reduce after the expiration of said interval the output of said valve and gradually to reduce the gain-controlling bias and thereby increase the amplification of said amplifier, and separate means operable after said amplification has increased during a predetermined time interval for applying to one of said electrodes a negative bias which rapidly reduces to a minimum the output of said valve, thereby rapidly to increase to a maximum the gain of said amplifier.

10. In a system of recording seismic waves of differing amplitude, the combination of an amplifier for said waves, means including a resistor for applying a gain-controlling biasing potential to said amplifier, an electric valve having an output circuit including said resistor, said valve being provided with two control electrodes, means including a source of supply for producing a biasing potential on one of said electrodes to block said valve, means including a resistor-capacity network connected to said one electrode for reducing said biasing potential to unblock said valve for flow of output current through said resistor for the production of a substantial gain-contracting biasing potential, means including a second resistor-capacity network for producing a biasing potential on the other of said control electrodes which concurrently varies in a direction to reduce said output current to produce a gradual expansion of amplification after said contraction, and means operatively associated with one of said electrodes and operable a predetermined time after initiation of said gradual expansion of said amplification rapidly to increase the biasing potential on said valve again to block it and thereby to produce rapidly maximum gain in the amplification of said waves.

EDWIN J. SHIMEK.